INVENTOR
ALLEN O. SUNDELIN

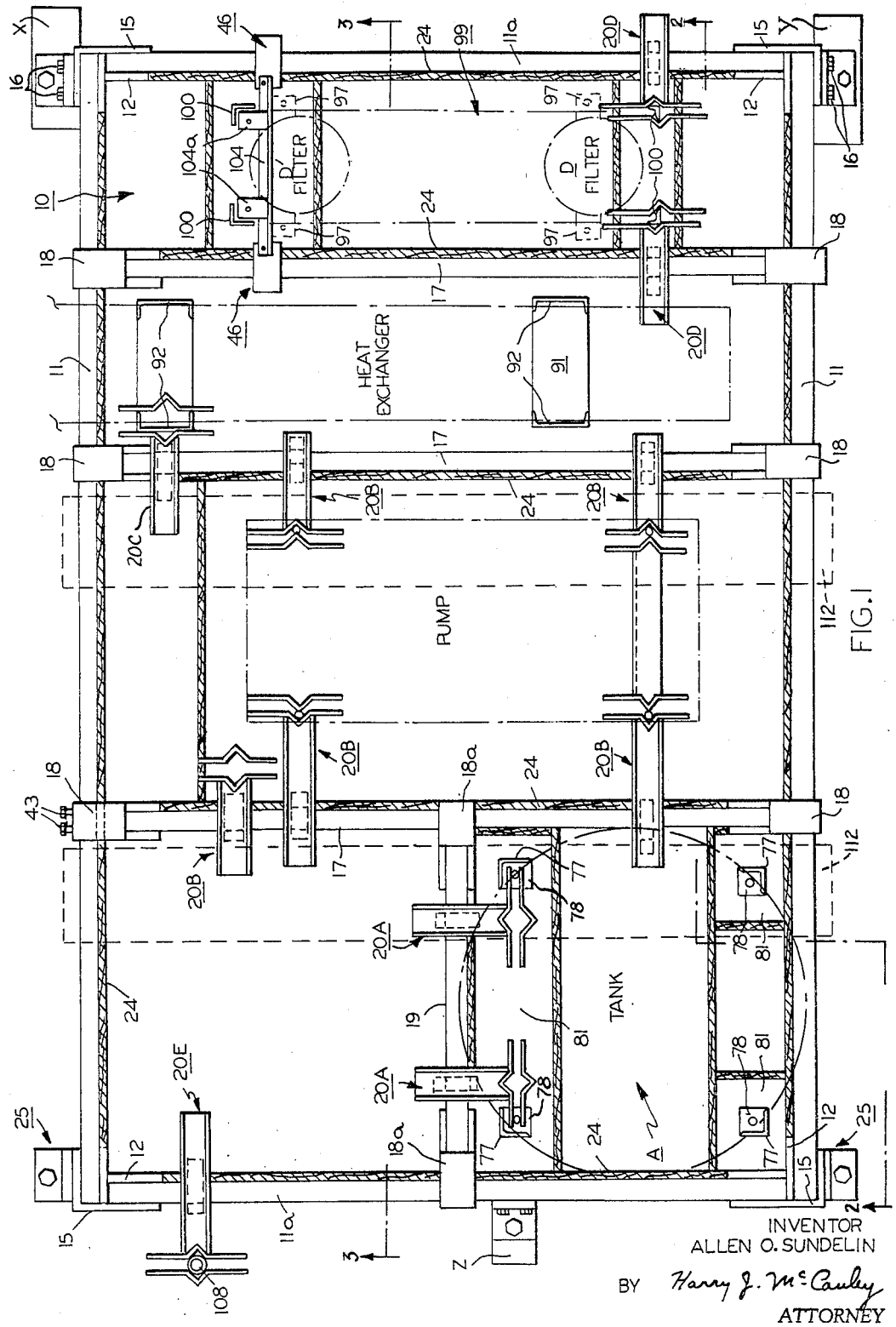

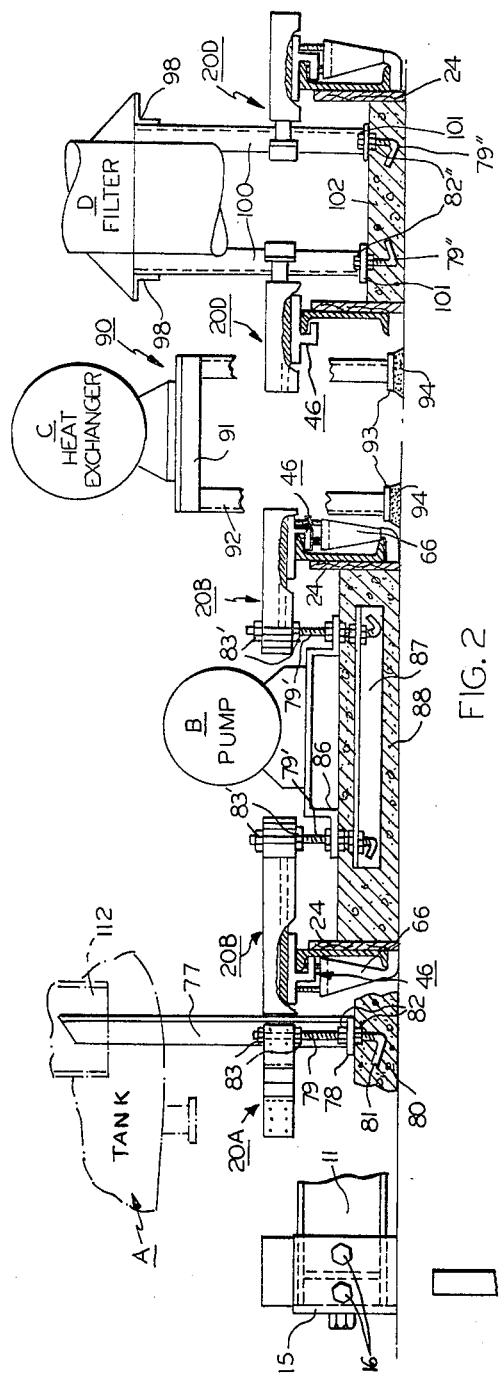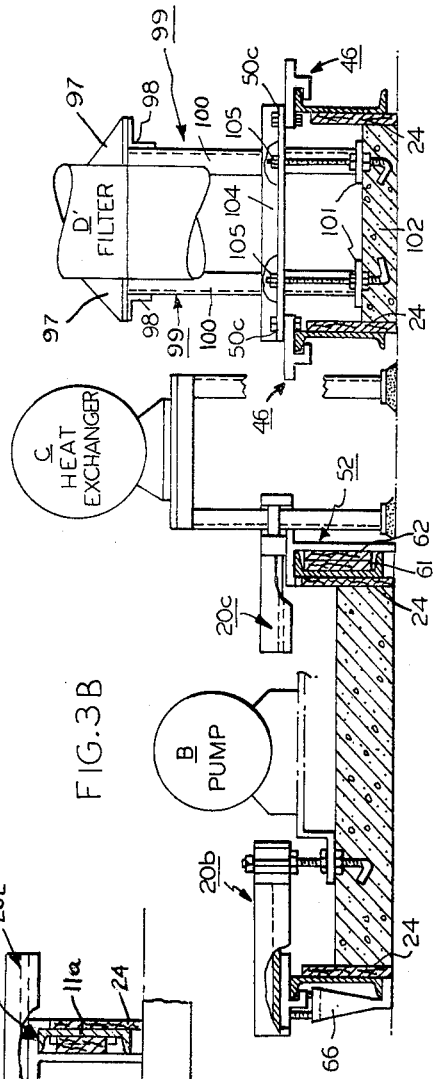

BY *Harry J. McCauley*

ATTORNEY

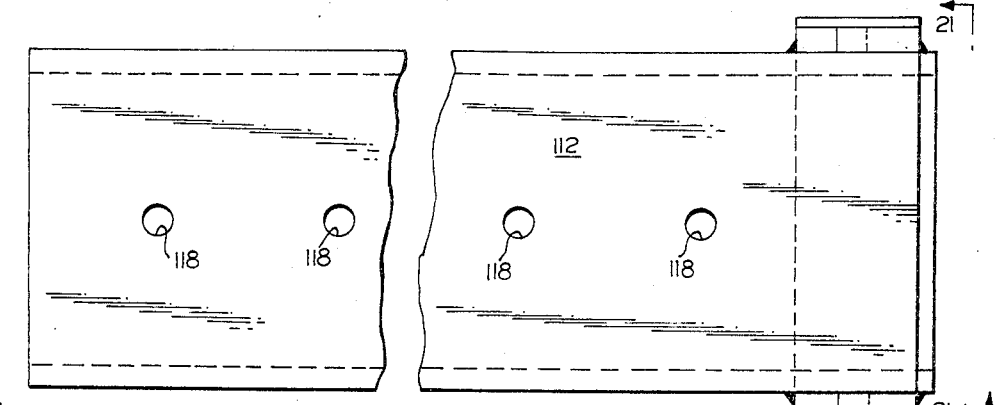
FIG.20
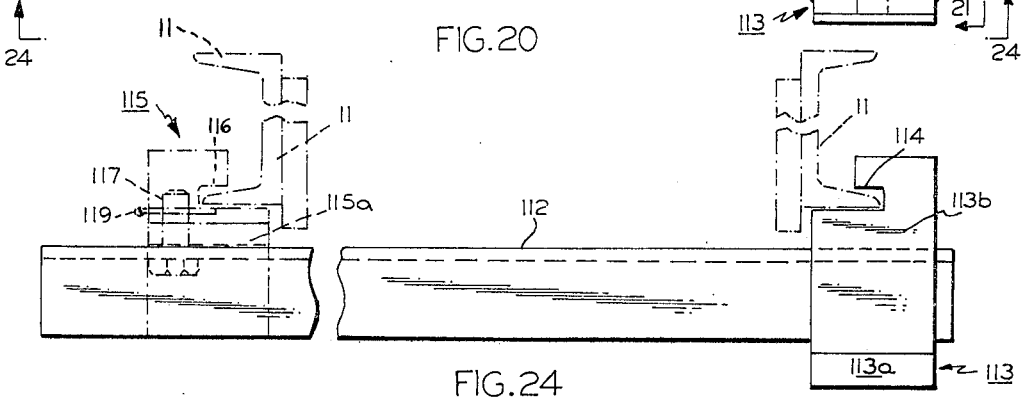
FIG.24
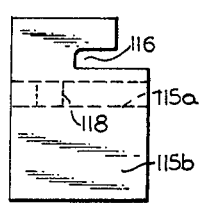
FIG.23
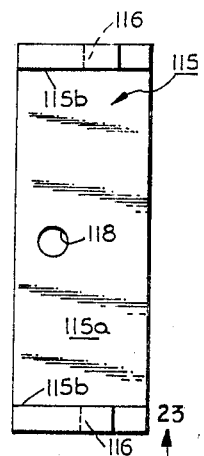
FIG.22
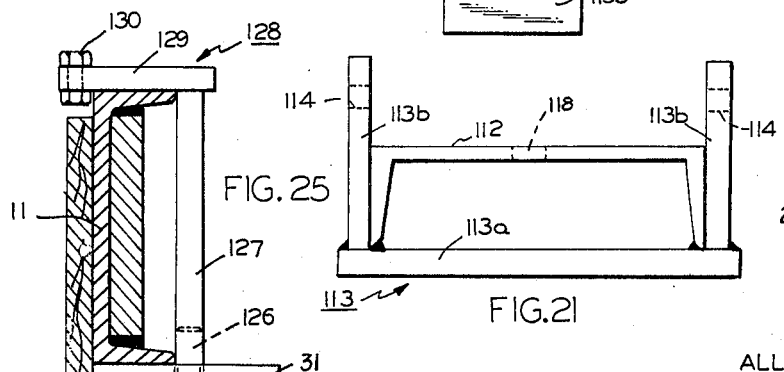
FIG.25 FIG.21
INVENTOR
ALLEN O. SUNDELIN
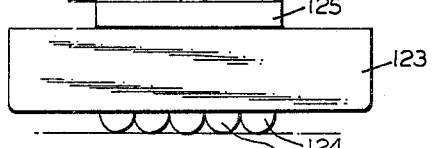
BY
ATTORNEY United States Patent Office 3,489,386
Patented Jan. 13, 1970

1

3,489,386
REUSABLE EQUIPMENT EMPLACEMENT RACK
ASSEMBLY
Allen O. Sundelin, Greenville, Del., assignor to E. I. du
Pont de Nemours and Company, Wilmington, Del.,
a corporation of Delaware
Filed Sept. 15, 1967, Ser. No. 667,886
Int. Cl. E04g 21/02
U.S. Cl. 249—13                          6 Claims

ABSTRACT OF THE DISCLOSURE

A reusable equipment emplacement rack constituting a frame for pre-assembling equipment components with reference to one another before permanent installation of the equipment as an entity at its final site.

BRIEF SUMMARY OF THE INVENTION

Figure 4:
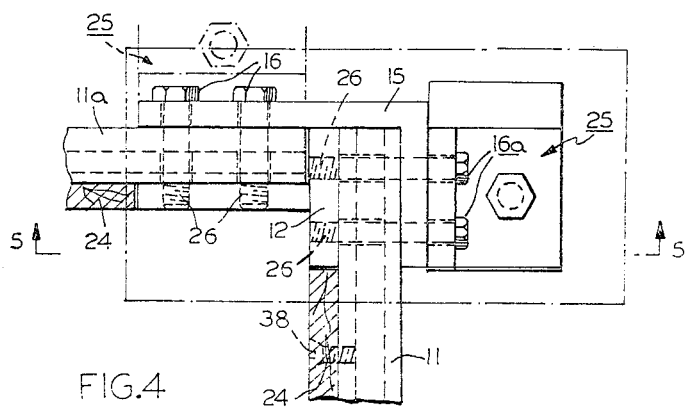

Generally, the invention comprises a reusable equipment emplacement rack assembly comprising, in combination, a substantially rigid open box frame, adjustably mounted transverse equipment support members hung at the ends from opposite side members of the box frame, adjustably mounted subsidiary equipment support members disposed substantially normal to the transverse equipment support members hung at the ends from contiguous ones of opposite end members of the box frame and transverse equipment support members, equipment attachment means fixed to said rack assembly at preselected locations thereon, and upright concrete form-defining strips fixedly secured at preselected locations along the concrete-confrontation lengths of the structural members constituting the rack assembly.

DRAWINGS

The construction of a preferred embodiment of this invention is detailed in the drawings attached, of which:

FIG. 1 is a top plan view of an equipment emplacement rack according to this invention (with clamp set screws and assembly bolts omitted except for three illustrative showings) utilized for the pre-assembly of a tank, pump, heat exchanger and twin filters in operative relationship with respect to one another, this equipment being indicated in broken line schematic representation so as to more clearly show the details of rack construction.

FIG. 2 is a broken section taken on line 2—2, FIG. 1, with background detail and jack supports omitted, FIGS. 3A and 3B taken together, and in the order recited extending from left to right, constitute a broken section taken on line 3—3, FIG. 1, with filter support structure partially cut away and with background detail omitted.

Figure 5:
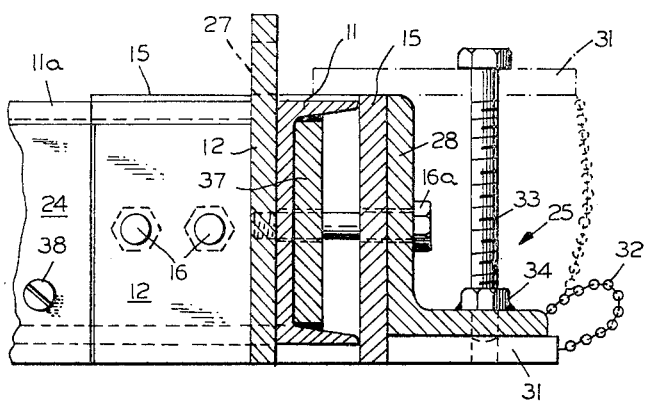
Figure 6:
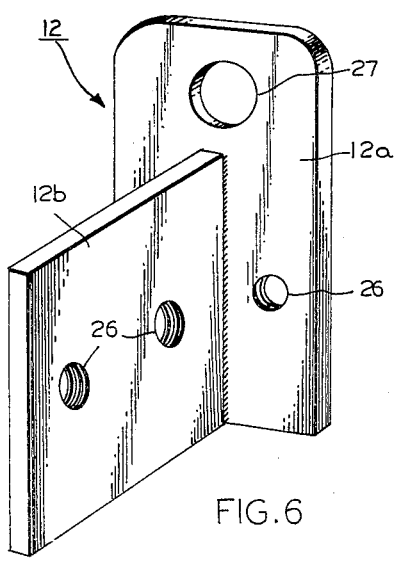
Figure 7:
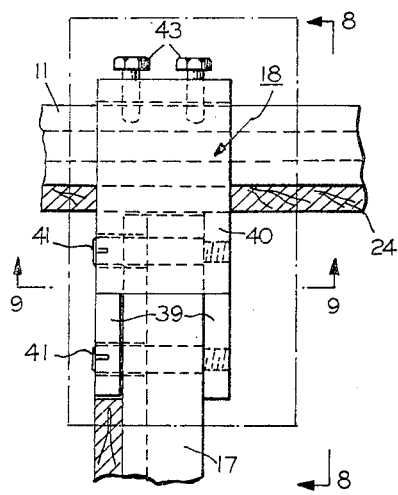
Figure 8:
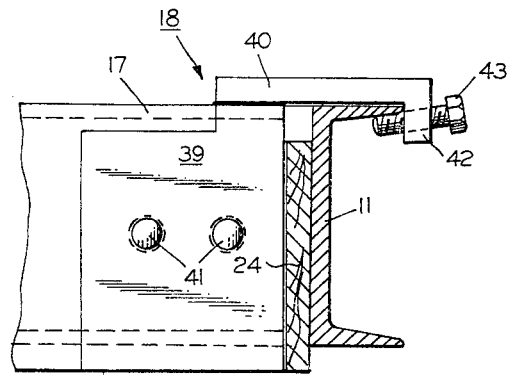
Figure 12:
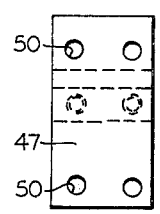
Figure 9:
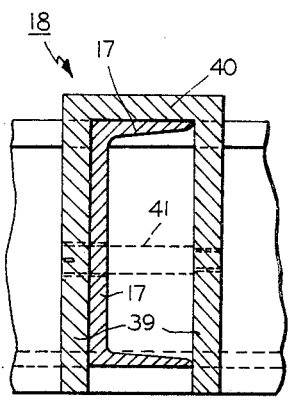
Figures 10, 11:
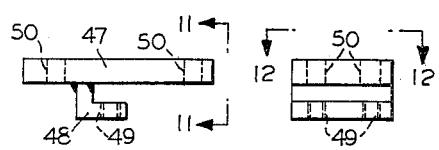
Figure 13:
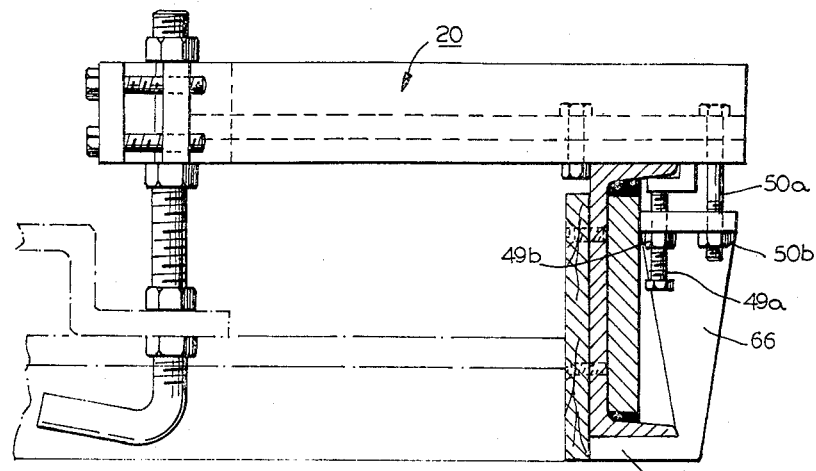
Figure 14:
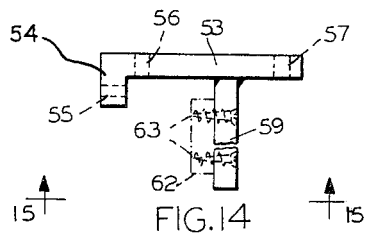
Figure 15:
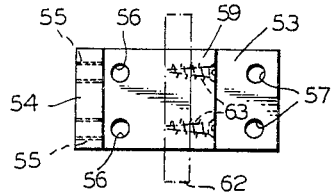
Figure 16:
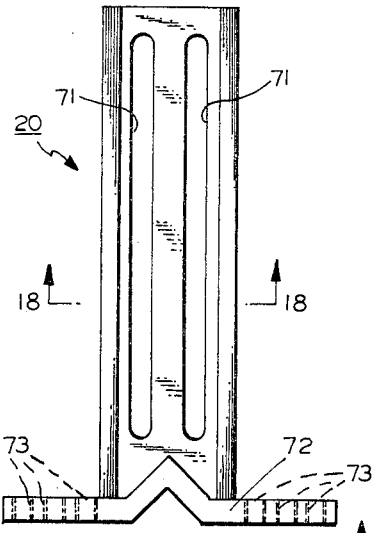
Figure 18:
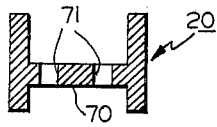
Figure 17:
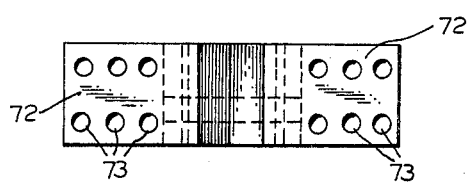
Figure 19:
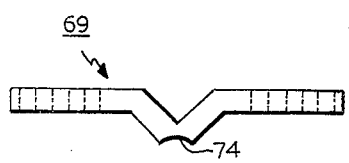

FIG. 4 is an enlarged plan view of the upper left-hand corner of the equipment emplacement rack of FIG. 1, FIG. 5 is a side elevation view taken on line 5—5, FIG. 4, FIG. 6 is a perspective view in reduced scale of a corner T, FIG. 7 is an enlarged plan view of a channel saddle for the adjustable attachment of a transverse equipment support member to the rack box frame, FIG. 8 is a section taken on line 8—8, FIG. 7, FIG. 9 is a section on line 9—9, FIG. 7, FIG. 10 is a side elevation view of an inside clamp, FIG. 11 is an end elevation as seen from line 11—11, FIG. 10, FIG. 12 is a plan view as seen from line 12—12, FIG. 13 is a side elevation view in cross-section detailing the attachment of an inside clamp provided with supplementary retaining means to a rack channel, FIG. 14 is a side elevation of an outside clamp, FIG. 15 is a bottom plan view as seen from line 15—15, FIG. 14, FIG. 16 is a plan view of a beam support for attachment of equipment pre-assembled on the rack of this invention, FIG. 17 is a front end view taken on line 17—17, FIG. 16, FIG. 18 is a sectional view taken on line 18—18, FIG. 16, FIG. 19 is a plan view of a co-operating clamp piece which attaches to the front end of the beam support shown in FIG. 17, FIG. 20 is a top plan view of a fork truck accommodation auxiliary, FIG. 21 is an end elevation taken on line 21—21, FIG. 20, FIG. 22 is a top plan view of the removable companion clamp provided for attachment of the fork truck accommodation auxiliary to the rack, FIG. 23 is an end elevation taken on line 23—23, FIG. 22, FIG. 24 is a side elevation taken along line 24—24, FIG. 20, detailing attachment of the fork truck accommodation auxiliary to the rack of this invention, and FIG. 25 is a side elevational view of a transport roller assembly shown in engaged relationship with respect to a rack channel member shown in cross-section, all other details of the rack being omitted.

DETAILED DESCRIPTION

Referring to FIGS. 1–4 particularly for an introductory overall summary description of the invention, the reusable equipment emplacement rack comprises a rigid open box frame, denoted generally at 10. This can be conveniently assembled from structural steel channel side members 11 and end members 11a (typically 8"–18.75 lb. size), which are held together by corner T's 12 and corner angles 15 attached to the channels by bolts 16. Channels 11 and 11a are assembled with their web portions oriented vertically and inwardly of the open area of box frame 10, and, accordingly, the upwardly disposed coplanar outwardly extending flanges of the channels 11 constitute ways for the reception of transverse equipment support members 17, which are steel channel lengths identical with members 11 and 11a. Transverse members 17 are of a length slightly shorter than the width of box frame 10, so that they can be readily slidably positioned in any preselected location along the lengths of side members 11, and are hung at the ends from members 11 with their upper flange portions generally coplanar with the top flanges of channels 11 and 11a by saddles 18. Subsidiary equipment support members 19, in all respects identical with transverse members 17, are slidably supported at the ends from contiguous ones of opposite end members 11a and transverse members 17 by saddles 18a, in all respects identical with saddles 18, which provides freely adjustable locations of these supports in a direction across the width of box frame 10 and thus normal to the direction of placement of transverse members 17.

It will be seen from FIGS. 1–3A, 3B that members 11, 11a, 17 and 19 define between them rectangular subdivisions of preselected shapes and areas for the accommodation of individual pieces of equipment which it is desired to preassemble upon the rack, this equipment being conveniently attached to the rack by length-adjustable cantilevered beam supports 20 clamped with complete freedom of choice to the top flanges of any of the channels 11, 11a, 17 and 19 closest at hand. It will be understood that a wide variety of equipment attachment devices can be employed with the rack of this invention; however, standardization on a single type of universal application is most economical, and the beam supports 20 have proved highly satisfactory in service.

Since permanent installation of equipment at its final site is accomplished, according to accepted construction practice, through the agency of poured concrete footings, pads or other bases integral with the building floor structure, concrete form-defining strips 24 (which are conveniently plywood boards) are fixedly attached along the concrete confrontation lengths of the structural members constituting the rack assembly. The assembled channels of box frame 10, attached support members 17 and 19, and any equipment supported thereby, are all elevated slightly above floor level by the extra height of T's 12 and angles 15 (FIG. 5), which is slightly greater (typically, 3/4") than the width of the channel webs, the depending edges of form-defining strips 24, however, being intended to rest firmly upon the floor, if the floor is sufficiently flat. Where the floor is sloped, bottom edge strips are tacked on in prolongation of strips 24, as hereinafter described, in order to close off any excessive lower edge openings from the rack interior. Level placement of the rack and apparatus pre-assembled thereon is effected by multiple jack supports, denoted generally at 25, mounted externally of the box frame at the four corners thereof.

Proceeding now with the detailed description of the separate elements of the equipment emplacement rack of this invention, FIGS. 4 and 5 illustrate the corner assembly. This is accomplished through the agency of internally disposed corner T 12 in association with externally disposed corner angle 15 which retain, between them, the perpendicularly aligned adjacent ends of a side member 11 and an end member 11a by bolt 16 attachment through aligned holes drilled in all three of the adjoining members. Bolts 16 are threadably engaged in tapped holes 26 provided in the legs of T 12, with inside ends flush with the inside faces of the T legs.

The shape of T 12 is most clearly shown in FIG. 6, the T conveniently comprising a back plate 12a provided with a perpendicularly disposed tongue 12b welded thereto, the back plate being drilled through at 27 to receive the lifting hook of an erecting crane for ready transport of the rack and equipment mounted thereon to elevated locations. It will be understood that T's 12 can be fabricated by casting, hand or drop forging or by other accepted shop techniques, if preferred over welding.

Jack supports 25 (FIG. 5) can conveniently comprise angle pieces 28 secured in position at the corners of the box frame by slightly longer assembly bolts 16a, adapted to concurrently attach the neighboring corner angle 15, side member 11 and corner T 12. These supports can be optionally attached on either side of a rack corner, as indicated in broken line representation in FIG. 4. Jack supports 25 preferably incorporate free bearing plates 31 underlying them and secured against loss therefrom by short retention chains 32 long enough to permit their clamped retention in stow position against the top surfaces of the frame channel webs, as indicated in broken line representation in FIG. 5. The jacking action of supports 25 is obtained by providing an elevating screw 33 threaded through a nut 34 welded to the top surface of the lowermost angle leg in line with drilled holes through both this leg and bearing plates 31. Thus, continued advance of screw 33 out of the basal opening of the bearing plate lifts frame 10 and its appurtenances to a preselected height achieving overall level positioning of the rack, even if the floor is sloped, irregular or otherwise imperfect.

It is sometimes desirable to stiffen the channels making up box frame 10, and this is readily accomplished by welding a back up plate 37 (FIG. 5) to the channel webs in the free space defined by the flanges, the plate then being drilled in line with bolts 16a to permit their free passage therethrough. Also, as shown in FIG. 4, the concrete form-defining strips 24, attached to the outside web faces by screws 38 threadably engaged in tapped holes therein, preferably abut flush at the ends against the adjacent edges of T's 12.

The construction of saddles 18 and 18a is detailed in FIGS. 7, 8 and 9, these constituting a pair of notched side plates 39 held together by a weld-attached crosspiece 40 adapted to closely enclose the ends of the channels constituting the transverse equipment support members 17, or the subsidiary equipment support members 19. The saddles are fixedly attached thereto by a pair of bolts 41 having their screw slot ends recessed within suitably sized drilled passages provided in one side plate 39 and their threaded ends engaged with companionate tapped threads in the other side plate 39. The outside edges of the cross-pieces 40 are provided with depending lips 42 which are drilled and tapped on a downward slant of, typically, 20° to threadably receive a pair of set screws 43 which, when advanced, wedge at the ends tightly against the undersides of the top channel flanges, thereby locking the saddles firmly at any desired location along members 11 and 11a. As indicated in FIGS. 8 and 9, saddles 18 and 18a are of equal height with corner T's 12 and corner angles 15, so that these members, together with strips 24, are substantially flush with the floor and thus present little clearance for poured concrete leakage. The saddles are not intended to sustain upward thrust loads, however, which are carried exclusively by jack supports 25.

Equipment pre-assembled on the rack of this invention is attached through the intermediacy of set screw-locked clamps, of which it is convenient to use two types, one being an inside clamp detailed in FIGS. 10–12, which locks against the underside of the upper flanges of the channels 11, 11a, 17 and 19, and the other being an outside clamp detailed in FIGS. 14 and 15, which locks against the web portion of channels 11, 11a, 17 and 19 but incorporates a long leg adapted to vertical disposition closely adjacent the two flange edges, so that load imposed on the flange side of the rack channels will not impose a dislodging torque on the clamp which could cause it to disengage from the channels.

The inside clamp, denoted generally in FIGS. 2 and 3B as 46, thus consists of a flat plate 47 provided with an integral hook portion 48 welded to the underside thereof with enough clearance between hook and plate to receive the channel flange snugly therebetween. The clamp, when locked to the flange by set screws threaded through the two tapped holes 49 in hook 48, is thus disposed with plate 47 overlying the uppermost channel flange generally perpendicular thereto, with opposite ends overhanging the flange edges enough to uncover the drilled holes 50 provided for bolt attachment of beam supports 20 as hereinafter described.

It is sometimes desirable, especially with loads carried at the ends of extended beam supports 20 as shown in FIG. 13, to afford additional retention of the inside clamps to the associated channels, and this is readily accomplished by providing an extra support in the form of an upright strut 66 having an upper flanged end drilled to receive the outboard ends of the set screws 49a engaged within tapped holes 49 and also the threaded ends of the outward pair of bolts 50a passed through drilled holes 50. The lower end of strut 66 is provided with a weld-attached hooked end 67 made sufficiently long to underlie substantially the full width of the bottom flange of the particular channel 11, 11a, 17 or 19 to which the clamp is to be secured. A separate locknut 49b is threaded onto the upper end of set screw 49a adjacent the screw head. Thus, after first locking the clamp to the underside of the upper channel flange by tightening set screw 49a thereagainst, strut 66 can be independently tensioned by drawing up on nuts 49b and 50b.

The outside clamp, denoted generally in FIG. 3A as 52, incorporates a flat plate 53 provided with a depending lip 54 adapted to abut the web portion of the channel it is utilized with, the lip being drilled and tapped at two points 55 to receive set screws attaching the clamp tightly to the channel. Plate 53 is provided with two pairs of holes having the same relative spacings as the corresponding holes of the inside clamp hereinbefore described to similarly accommodate the beam supports 20 to be attached thereto. Of these, the pair of holes 56 adjacent lip 54 are drilled and tapped to permit the use of short machine screws here, which do not penetrate the thickness of the plate to any degree interfering with the free advance of the set screws threaded through lip 54, whereas the pair of holes 57 are unthreaded bores adapted to receive the same size of beam support 20 attachment bolts as the inside clamps.

As previously mentioned, the outside clamp incorporates a depending leg portion which is conveniently a flat plate 59 attached co-parallel with lip 54 by weld joinder of the upper edge to the underside of plate 53 at a spacing from lip 54 snugly receiving the flange width of channels 11, 11a 17 and 19 therebetween. Plate 59 is long enough to abut both flange edges of a channel to which it is assembled and is preferably made of the same height as corner T's 12, corner angles 15 and saddle plates 39.

To further safeguard against dislodgement of outside clamps 52, it is preferred to back plate 59 with a wood filler block such as that denoted at 61 in FIG. 3B, interposed against the channel web inside the two channel flanges. Since it is sometimes desirable to mount concrete form strips on the flange sides of the channels making up the racks of this invention, it is convenient to provide short nailing strips 62 carried by the outside clamps 52 to which the concrete form strips can be nailed in general prolongation with the width dimensions of the outside clamps. Such a nailing strip 62 is shown in broken line representation in FIGS. 14 and 15, this being attached to the inside surface of back plate 59 by wood screws 63 passed through drilled and countersunk holes in back plate 59. These nailing strips abut the filler blocks 61, as shown in FIG. 3B, and thus fill in the remaining void within the channel, thereby contributing firm clamp backing as well as constituting nailing strips for concrete form strip attachment.

Beam supports 20 are unitary struts (FIGS. 16 and 17) of general H cross-section as shown in FIG. 18, the underside 70 of which is adapted to receive plates 47 of inside clamps 46 or plates 53 of outside clamps 52, with the beam supports being adjustably attached thereto by bolts such as 50a hereinbefore described passed through slots 71 machined over the central lengths of the support beams. The equipment supporting ends of beam supports 20 are provided with integral flanges 72 drilled and tapped at 73 to receive machine screws, not shown, adapted to attach to flange 72 a companionately drilled co-operating clamp piece 69, FIG. 19. The central portions of elements 72 and 69 are shaped into 90° V's which, when the recesses are opposite one another, form jaws for the secure retention of pipes, angle irons, channels, rectangular cross-section struts or other conventional structural steel shapes which are employed as equipment support members in construction. On the other hand, if clamp piece 69 is reversed, so that its vertex portion is disposed within the V of flange 72, it is possible to clamp relatively small-diameter members such as threaded rods and the like, especially if the outer vertex face of piece 69 is formed to an arcuate profile as indicated at 74.

The utilization of the reusable equipment rack assembly of this invention will become evident from FIGS. 1–3A, 3B, inclusive, which portray, in broken line schematic partial representation, an assemblage of a tank, pump, heat exchanger and filters (interconnecting piping not shown), and the several supports and poured concrete footings for each.

Thus, the lower left-hand corner of the rack, as seen in FIG. 1, accommodates the tank A which is supported on four weld-attached vertical angle iron legs 77 disposed symmetrically around the tank periphery. Each leg is provided with a foot plate 78 securely welded at the edges within the internal angle portions of legs 77 and these plates are drilled centrally to receive vertically disposed anchor bolts 79 having hooked lower end portions 80 adapted to be buried within the concrete footings 81. It will be understood that anchor bolts 79 are adjusted to preselected levels with respect to foot plates 78 by lock nuts 82 before emplacement in the fresh concrete of the footing, the tank being during this time hung from the rack by beam suports such as 20A (only two of which are shown in FIG. 1), the clamp elements 69, 72 of which lock on the upper ends of bolts 79. Bolts 79 are preferably provided at the upper ends with nuts 83 to safeguard against loss of the bolts by slippage.

It will be seen from FIG. 1 that a single long footing accommodates the two inside legs of tank A, whereas individual footings are employed for the exterior legs, all form lumber adjacent the channels 11, 11a, 17 and 19 constituting the strips 24 carried by the channels, whereas the remainder are boards supplied by carpenters at the final erection site, blocked and cross-braced against one another in conventional manner not detailed. When the concrete footings 81 have set, bolts 79 can be cut off just above upper lock nut 82, if desired, or the full height anchor bolt can be left in place permanently by detaching the clamp elements of beam supports 20A when the rack is to be removed.

Pump B is provided with an integral channel-like base 86, drilled at the four corners to receive individual anchor bolts 79' which can be, in all respects, identical with anchor bolts 79 previously described, except that, in this instance, firmer anchoring is achieved by tieing the lower ends of bolts 79' together by insertion through holes drilled in a length of angle iron 87 intended to be immersed in the fresh concrete of footing 88. Anchor bolts 79' are hung at the upper ends from beam supports 20B which, in this case, utilize adjacent V disposition of beam support flanges 72 and clamp pieces 69, with the arcuate grooves 74 of the latter abutting the curved profiles of bolts 79' for better locking action, which is further assured by nuts 83' attached above and below the clamp halves. Since beam supports 20B are relatively long, and thus tend to impose a high bending moment to the upper flange of the associated channel, it is preferred to attach the supports to the rack channels with inside clamps 46 reinforced by subsidiary struts 66 as shown in full detail in the central section of FIG. 2.

Heat exchanger C is mounted at each end on gate-like end frames denoted generally at 90, FIG. 2, these consisting of a pair of vertically disposed, inwardly oriented channel legs 92 tied together at the top by a structural steel channel cross-piece 91 joined thereto by welding. Each leg 92 is hung from an individual beam support 20C, only the upper left-hand one of which is detailed in FIG. 1. Individual weight-distributing foot plates 93 are welded to the bases of legs 92 and support for the heat exchanger, its end frames and attachments is provided by grout footings 94 troweled under each of the foot plates.

The right-hand section of the rack is reserved for two alternately operated filters D and D', which are supported on lugs 97 welded opposite one another on the outside peripheries of the cylindrical filter housings, as shown in FIG. 1 particularly. Lugs 97 are bolt-secured to the angle iron cross-pieces 98 of a pair of gate-like frames denoted generally at 99, which are oriented parallel to channels 11a and 17. The weight of the entire assembly is carried by the four angle iron legs 100, each provided at their bases with foot plates 101 welded thereto, which are drilled to receive anchor bolts 79" carrying lock nuts 82", the hooked lower ends of the bolts being embedded in the concrete footings 102 poured during installation of the equipment at the final erection site.

Two alternate means of attachment of the preassembled equipment on the rack are detailed in FIGS. 1–3A, 3B the opposite legs 100 underlying filter D being provided with beam supports 20D, the flange and clamp elements of which retain, between them, individual angle iron legs as clearly shown in FIGS. 1 and 2. The other attachment means, shown here with respect to filter D' solely, utilizes a short length of angle iron 104 secured to the rack channels through the agency of inside clamps 46 as shown in FIG. 3B, connection therewith being made directly by bolts 50c, thereby dispensing with beam supports. The anchor bolts, assembled at the proper heights with respect to their foot plates 101, are hung from holes drilled through lug extensions 104a, welded outboard of angle iron 104, by attachment with nuts 105, permitting ready disconnection after the underlying footing 102 is poured and set.

Equipment pre-assembly on the rack of this invention is not restricted to the inside confines of box frame 10 but can also be external. Thus, an upright pipe support 108, which can serve as an instrument or switch mount for the other equipment carried by the rack, is shown in FIGS. 1 and 3A hung by beam support 20E through the agency of an outside clamp 52 outside the left-hand end member 11a. Pipe support 108 is provided with the usual screw flange base 109 drilled for expansion bolt reception permitting attachment of the support securely to the floor at the erection site.

In practice, it is preferred to pre-assemble equipment on the emplacement racks in a building especially provided for this purpose, in that it can be supplied with a complete inventory of assembling tools, beam supports, inside and outside clamps, and the like, so that pre-assembly can be accomplished with maximum efficiency by personnel experienced in the tasks involved and protected from exposure to the elements. A central pre-assembly facility can also be economically furnished with a variety of rack-moving apparatus permitting the ready transport of racks in and out of the shop and to any desired location on the shop floor. In this connection, reference has already been made to crane hook transport with attachment effected via lift holes 27, FIG. 6. However, it is equally feasible to use conventional fork lift trucks for the transport, in which case it is preferred to employ a pair of lift truck fork-receiving, weight-distributing channels 112 (FIG. 1), which are adapted to clamp-on attachment with the web portions abutting the underside of the rack in a region clear of supported equipment and adjacent the approximate center of gravity of the rack loaded with its full complement of pre-asembled equipment.

Channels 112 are detailed in FIGS. 20–24, inclusive, and incorporate a fixed end clamp, denoted generally at 113, having a horizontal base piece 113a underlying the open width of channel 112 and securely welded thereto at the flange edges. This clamp embodies a pair of upstanding ears 113b notched at 114 on the inboard sides confronting a rack channel 11 slightly elevated above channel 112 at a height receiving the lower flange edge thereof and locking thereon, as shown in FIG. 24.

Removable companion clamp 115 (FIGS. 22–24) is, in all respects, similar to fixed clamp 113 but is instead provided with a base portion 115a weld-attached centrally of ears 115b at a level overlying the web portion of channel 112. The upstanding ears of clamp 115 are machined with notches 116 at a level receiving the confronting lower flange edge of box frame 10 when brought into snug abutment thereagainst, retention being assured by a lock pin 117 passed through an aligned hole 118 drilled through the web of channel 112, which lock pin is held in place by cotter key 119. A multiplicity of holes 118 are spaced along channel 112 at predetermined points, conveniently at 12″ spacings, to permit clamp attachment to internal rack channels or to accommodate racks of smaller overall widths, where these are employed.

It is also entirely practicable to employ conventional heavy equipment roller sets, such as that detailed in FIG. 25, which are temporarily attached to a rack at any time that it is desired to transport it to a different location. These roller sets comprise a heavy base 123 within which are journaled a multiplicity of cylindrical rollers 124. The base is provided with a pedestal 125 mounting within its top face a multiplicity of ball bearings (not shown) upon which rests the free load-carrying plate 31 abutting the underside of the rack channel which, in this instance, is shown as a channel 11. Pedestal 125 has secured thereon an upstanding pin 126 passed through a hole drilled through plate 31, which thereby retains the latter in place, the upper length of the pin then seating within a notch machined in the depending leg 127 of an angle lock denoted generally at 128. The horizontal leg 129 of the lock is adapted to overlie the top flange of the box frame 10 channel to which the roller is to be secured, with attachment effected by a depending nut and bolt denoted collectively at 130 engaged through a drilled hole in the projecting end of leg 129 and extending adjacent the channel web, to thereby lock the whole securely to the rack channel.

Roller sets are preferably mounted at three generally symmetrically separated locations around the rack, as denoted at X, Y and Z, FIG. 1, to provide best maneuverability in transport, and may be temporarily substituted for jack supports 25 at the rack corners during the transport operation.

Racks carrying pre-assembled equipment sub-assemblies are frequently transported by truck or rail considerable distances to their plant erection sites. When they arrive at the sites, they are moved to their predetermined installation locations and carefully leveled to insure accurate vertical equipment alignments. Following this, if the concrete form-defining strips 24 do not abut the floor surface, which may not be level, especially in the vicinity of sloped floor drains, wooden from extension strips are tacked on at the bottom edges to close off the concrete puring area within the forms. If desired, chamfer strips are also tacked to the form strips to impart a corresponding slope to the concrete footings, after which concrete is poured to emplace the equipment in integral attachment with the building site floor.

The racks are allowed to remain in position until the footings have hardened, after which all rack connections with anchor bolts, equipment support members and the like are severed and the rack is lifted off the equipment, which now has been permanently installed at its working site. If there is low overhead clearance, or lift-off removal is otherwise inconvenient, the racks can be readily disassembled to the extent that the remaining joined channels clear any enclosed erected equipment, and the rack parts then removed separately. It is only necessary to make the few remaining process and service piping connections between the several equipment sub-assemblies and also to provide the utilities required for manufacturing operation in order to complete the entire construction, and this is facilitated by the relatively clean simple preceding equipment emplacement, which was accomplished without the need for any extensive or fitting labor.

The equipment emplacement rack assemblies of this invention have proved to be easily detachable from equipment emplaced therewith, and are re-usable indefinitely, together with their beam supports and other attachments, with great savings in cost. In addition, there is considerable savings over the use of equipment supports of various types permanently installed at the equipment sites, which thereafter require expensive painting or other surface protection maintenance over the full service life.

From the foregoing, it will be understood that this invention is capable of wide modification within the skill of the art without departure from its essential spirit, and it is accordingly intended to be limited only by the scope of the appended claims.

What is claimed is:

1. A reusable equipment emplacement rack assembly for molding concrete comprising, in combination, a substantially rigid open box frame, adjustably mounted transverse equipment support members hung at the ends from opposite side members of said box frame, adjustably mounted subsidiary equipment support members disposed substantially normal to said transverse equipment support members and hung at the ends from contiguous ones of opposite end members of said box frame and said transverse equipment support members, equipment attachment means fixed to said frame and support members at preselected locations thereon, upright concrete form-defining strips fixedly secured at preselected locations along lengths of said frame and support members, and said attachment means including means adapted to releasably suspend equipment within the spaces defined by said strips.

2. A reusable equipment emplacement rack assembly according to claim 1 wherein said open box frame is assembled from structural steel members oriented at the ends substantially perpendicular to one another and attached together at each adjacent end pair by rigid cooperating angular elements disposed on opposite sides of said structural steel members and connected therewith by rigid fasteners.

3. A reusable equipment emplacement rack assembly according to claim 1 provided with a multiplicity of leveling devices disposed generally symmetrically of the rack assembly.

4. A reusable equipment emplacement rack assembly according to claim 1 wherein said open box frame is fabricated from structural steel channels arranged with flange portions oriented outwardly.

5. A reusable equipment emplacement rack assembly according to claim 1 wherein said adjustably mounted transverse and subsidiary equipment support members are assembled on the frame with saddles comprising a cross piece overlying the member of the existing rack structure to which joinder is desired, said cross piece being provided with a pair of side plates receiving between them an end of a single one of said equipment support members, rigid fastening means attaching said side plates and said end fixedly together, and means locking said saddle in preselected location with respect to said existing rack structure.

6. A reusable equipment emplacement rack assembly according to claim 1 wherein said equipment attachment means comprises a cantilevered beam support secured to the existing rack structure by means adjustably retaining said attachment means at a preselected overhang with respect to the rack structure.

References Cited

UNITED STATES PATENTS

| 1,600,433 | 9/1926 | Stieler | 249—93 |
| 2,809,414 | 10/1957 | Mitchell | 249—2 |
| 3,376,010 | 4/1968 | Myer | 249—13 |

FOREIGN PATENTS

| 204,266 | 5/1966 | Sweden. |

J. SPENCER OVERHOLSER, Primary Examiner

R. D. BALDWIN, Assistant Examiner

U.S. Cl. X.R.

52—645; 269—55